Jan. 8, 1946.    E. H. STIVENDER    2,392,425
REMOTE CONTROL SYSTEM
Filed Feb. 23, 1940    3 Sheets-Sheet 1

Inventor
E. H. Stivender
by G. F. Ellvin
Attorney

Jan. 8, 1946.     E. H. STIVENDER     2,392,425
REMOTE CONTROL SYSTEM
Filed Feb. 23, 1940     3 Sheets-Sheet 2

Inventor
E. H. Stivender
by
Attorney

Patented Jan. 8, 1946

2,392,425

UNITED STATES PATENT OFFICE 2,392,425

REMOTE CONTROL SYSTEM

Edward H. Stivender, West Allis, Wis., assignor to Allis-Chalmers Manufacturing Company, Milwaukee, Wis., a corporation of Delaware Application February 23, 1940, Serial No. 320,387

12 Claims. (Cl. 172—239)

This invention relates in general to improvements in remote control systems and more particularly to means for the remote control of the electrical actuation of a member to predetermined positions against the action of appreciable resisting forces.

It is known to control remotely the actuation of the rotor of a motor having a plurality of concentrated stator windings by variably connecting such windings with a source of direct current through a circular rheostat formed with a uniformly distributed resistance conductor and provided with rotating contact arms. Such system is, however, of very little practical value because the rotation of the rotor does not follow regularly the rotation of the contact arms and also because the torque that the rotor may exert on any element to be driven thereby varies greatly at different positions of the contact arms and of the rotor. Remote control systems utilizing so-called self-synchronous motors also present serious disadvantages. In particular, in such systems a torque equal to the torque to be exerted by the receiving device must be impressed on the transmitting device, the receiving devices easily fall out of step, and several receiving devices cannot generally be connected in parallel without danger of their entering into oscillatory motion. Indeed, self-synchronous devices are generally provided with air damping devices to reduce their oscillations and to prevent their rotors from rotating continuously at synchronous speed.

The above disadvantages may be obviated by utilizing a signal transmitting device comprising a device for causing electrical energizing effects to be varied in a predetermined non-uniform manner, such as a rheostat in which the resistance elements are distributed in a predetermined non-uniform manner, and a signal receiving device in which the stator windings are also distributed in a predetermined manner. It is then possible to cause the rotor to rotate through angles proportional or equal to the angles of rotation of the rheostat arm within any desired range of operation. The rotor may also exert a torque which may be maintained constant within any desired range of operation, thereby permitting the most efficient utilization of the system for actuating devices having an appreciable resisting torque. The rotor, however, may also be caused to exert torque varying in any desired manner within any desired range of operation. In addition, the system may be so arranged as to cause the rotor to rotate in one direction only in response to rotation of the rheostat arm in either of its two normal directions of rotation, and to cause the rotor to remain stationary during rotation of the rheostat arm within a predetermined range. The features of the invention, however, do not limit its use to rotary apparatus, but are also applicable to devices having a rectilinear or any other movement.

It is therefore an object of the present invention to provide an improved system for remotely causing actuation of a signal receiving device in strict accordance with the movement of a signal transmitting device within a predetermined range.

Another object of the present invention is to provide an improved system for causing a signal receiving device to exert predetermined efforts at predetermined positions.

Another object of the present invention is to provide an improved system for remotely controlling the actuation of a plurality of signal receiving devices from a single signal transmitting device.

Another object of the present invention is to provide an improved system in which the motion of a signal receiver may be interrupted or reversed in response to continuous motion of a signal transmitter.

Objects and advantages other than those above set forth will be apparent from the following description when read in connection with the accompanying drawings, in which:

Fig. 1 diagrammatically illustrates a system comprising several embodiments of the present invention arranged for the control of a plurality of prime movers and of electric generators forming part of an electric drive for the propellers of a ship;

Fig. 2 diagrammatically illustrates the preferred arrangement of the connections of the main signal transmitter and receiver illustrated in Fig. 1;

Figure 1:
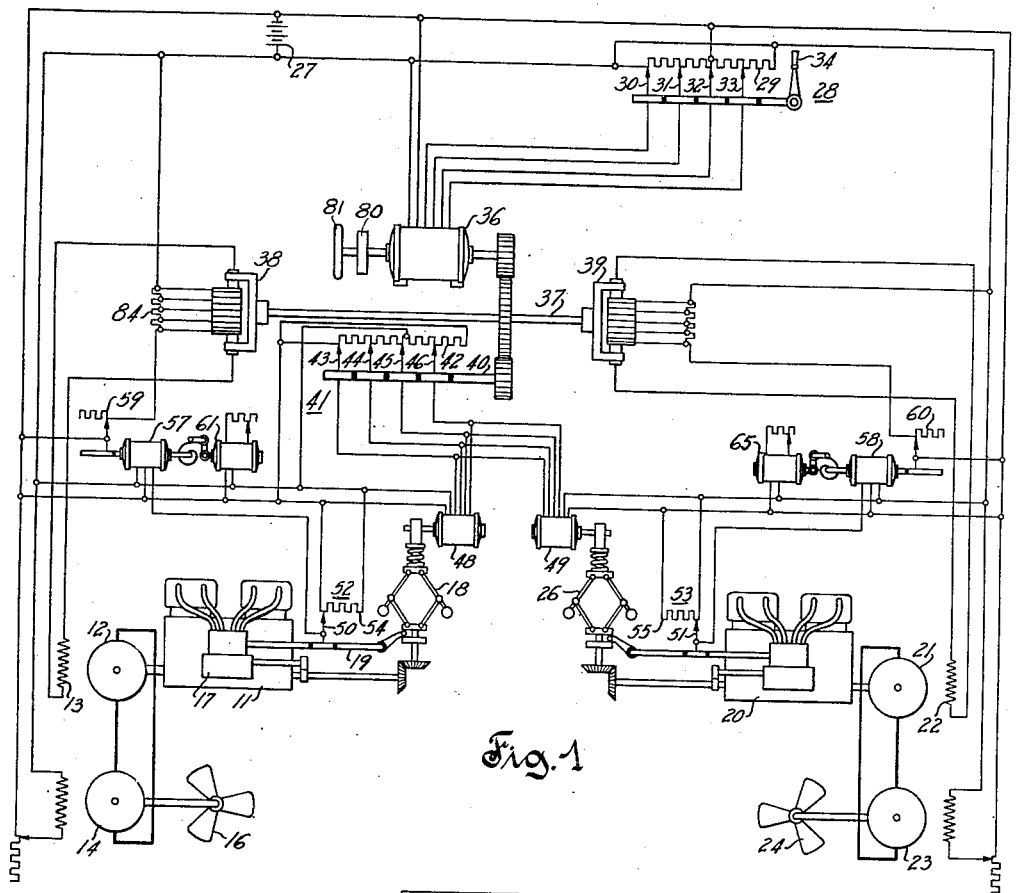
Figure 8:
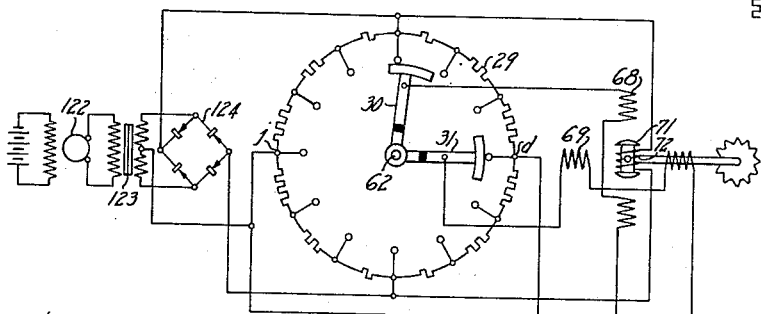
Figure 7:
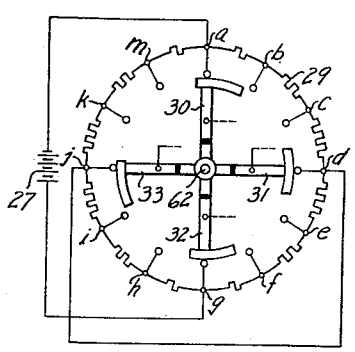
Figures 2, 3, 4, 5:
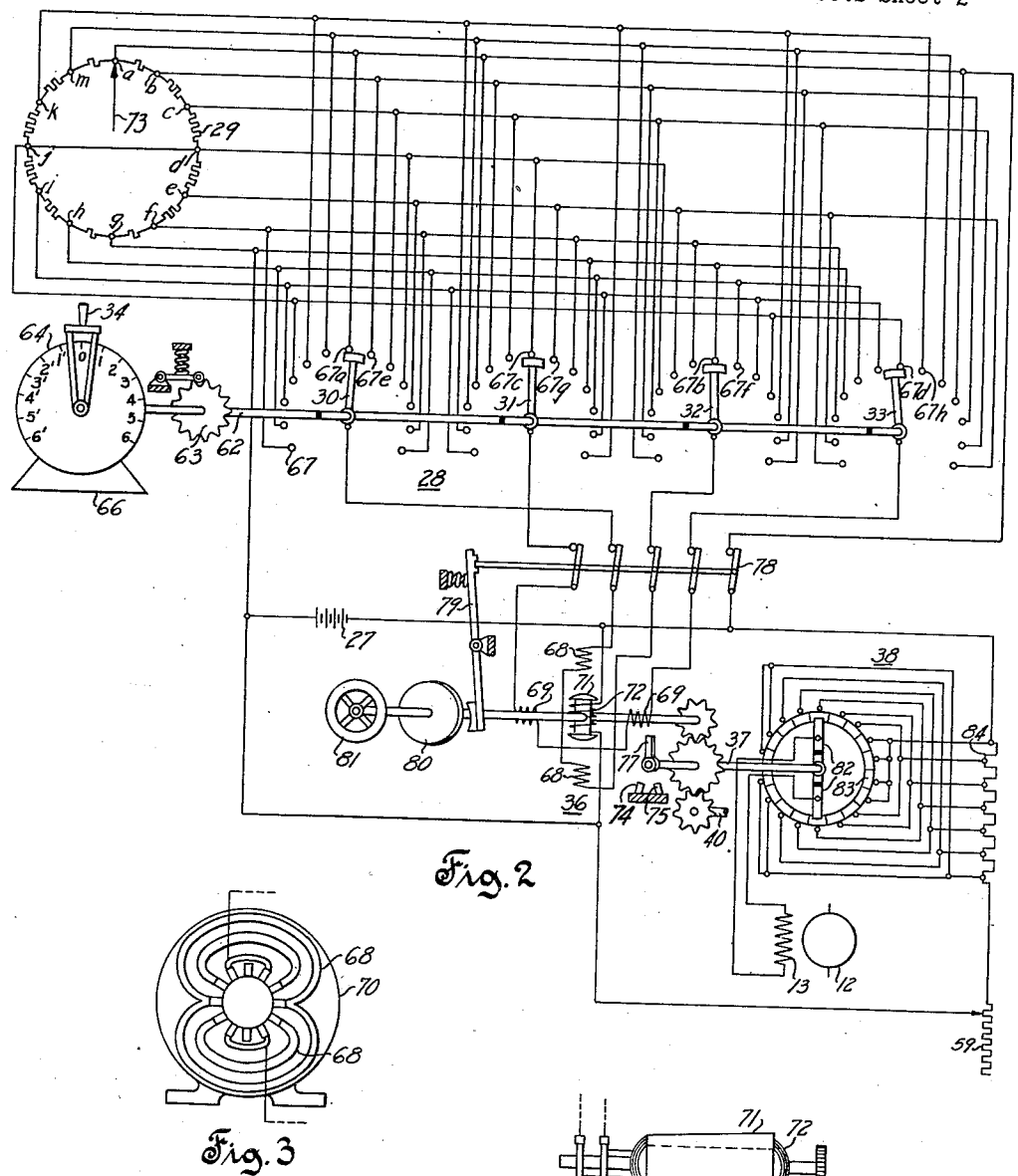
Fig. 3 is an end view of the stator of the main receiver illustrated in Fig. 2 showing the end connections of only one of the stator windings.
Fig. 4 is an end view of the stator of the main receiver illustrated in Fig. 2 showing the end connections of the other stator winding only.
Fig. 5 is a plan view of the rotor of the main receiver illustrated in Fig. 2, but drawn on a larger scale than Figs. 3 and 4.
Figure 6:
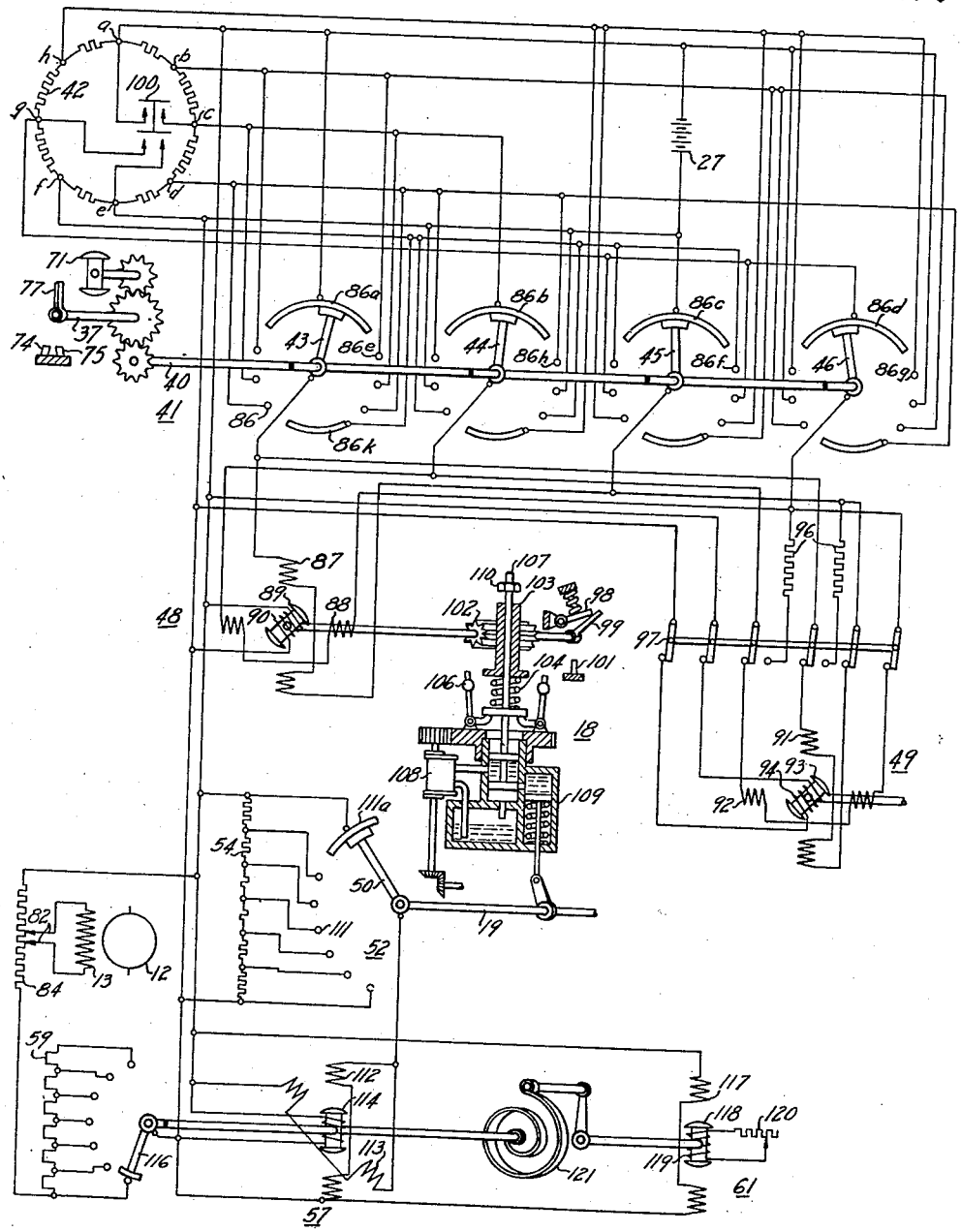

Fig. 6 diagrammatically illustrates the preferred arrangement of the connections of the governor controlling system and of one of the power limiting systems included in Fig. 1;

Fig. 7 diagrammatically illustrates a modification of the main transmitter illustrated in Fig. 2; and Fig. 8 diagrammatically illustrates another modification of the transmitter illustrated in Fig. 2 and of its connections.

Referring more particularly to the drawings by characters of reference, Fig. 1 illustrates a ship propulsion system in which numeral 11 designates a prime mover such as an internal combustion engine of the Diesel type driving the armature of a direct current generator 12 having a separately excited field winding 13. Generator 12 supplies current to a separately excited motor 14 driving a propeller 16. Engine 11 is provided with the usual fuel pump 17 and its operation is controlled by a speed responsive governor generally designated by 18. The governor acts on a control shaft 19 serving to vary the adjustment of pump 17 to thereby regulate the supply of fuel to engine 11.

Engine 11 is assumed to be operated and controlled jointly with a second engine 20 driving a generator 21 having a separately excited field winding 22. Generator 21 supplies current to a second separately excited motor 23 driving a second propeller 24. Engine 20 is provided with a governor 26 similar to governor 18. The field windings of generators 12, 21 and of motors 14, 23 are excited from any suitable source of direct current such as a battery 27.

The propulsion system above briefly described is assumed to be controlled from the bridge of the ship by means of a system comprising a main signal transmitter 28 located on the bridge. Transmitter 28 comprises a suitable impedance device such as a resistor 29 of any suitable type provided with contact means such as brushes 30, 31, 32 and 33 actuated by a common handle or lever 34. Resistor 29 may be of the slide wire type arranged for direct engagement of the brushes with the resistor conductor, as diagrammatically represented in Fig. 1, and may be wire wound or made of a bar of solid resistance material. Resistor 29 may also consist of a plurality of jointly variable rheostats such as carbon pile rheostats. Resistor 29 is preferably connected with a source of direct current such as battery 27, but it may also be supplied with pulsating or even alternating current. When a source of alternating current is utilized, resistor 29 may also be replaced by a reactor having adjustable taps.

Current is transmitted from battery 27 through direct connections and through transmitter 28 to the windings of a main receiver of the dynamo electric type generally designated by 36. Receiver 36 is geared to the shaft 37 of a pair of rheostats 38, 39 controlling the magnitude and the direction of flow of current through field windings 13, 22. Shaft 37 is geared in turn to the shaft 40 of an auxiliary transmitter 41. The latter transmitter operates on the same principle as transmitter 28 and comprises a resistor 42 and brushes 43, 44, 45 and 46. Battery 27 and brushes 43 to 46 are connected with the windings of a pair of identical receivers 48, 49 severally controlling the adjustment of governors 18, 26 to vary the running speed of engines 11, 20. The governor shafts control, in addition to the fuel pumps, the brushes 50, 51 of another pair of auxiliary transmitters 52, 53 comprising a pair of resistors 54, 55 preferably connected with battery 27. Transmitters 52, 53 control the supply of current from battery 27 to a pair of receivers 57, 58 serving to adjust a second pair of rheostats 59, 60 for controlling the field currents of generators 12, 21. Receivers 57, 58 are preferably provided with damping devices 61, 65.

The preferred embodiment of transmitter 28 is diagrammatically illustrated in detail in Fig. 2 which shows brushes 30 to 33 mounted in insulated relation on a common shaft 62 actuable by means of lever 34. Shaft 62 is adapted to be rotated both in the clockwise and in the counterclockwise directions to cause brushes 30 to 33 to variably engage resistor 29 at selected positions. These positions may be chosen at will but are preferably limited in number by means of a star wheel 63, whereby movement of shaft 62 from one position to the next is caused to take place by equal steps. The different positions of shaft 62 may be indicated by lever 34 on a dial 64 and the movement of lever 34 may be limited in both directions of rotation by means of a stop 66. Lever 34 is shown in a neutral position designated as position zero and is assumed to be movable in the clockwise direction, for example, into a plurality of positions 1 to 6 to cause the ship to travel ahead at increasing speeds and to be movable in the counterclockwise direction into another plurality of positions 1' to 6' to cause the ship to travel astern at increasing speeds.

Resistor 29 forms a closed circuit and is preferably provided with a plurality of taps 29a to 29m of which taps 29a and 29g are connected with the terminals of battery 27. Although a large number of taps is generally advantageous, resistor 29 is assumed provided with only 12 taps to simplify the drawings. The taps of resistor 29 are provided with a plurality of contacts 67 arranged in a plurality of circular rows severally cooperating with brushes 30 to 33 to permit selective engagement of the brushes with the taps upon actuation of shaft 62. Brushes 30 to 33 may be staggered with respect to the associated contacts to prevent the brushes from all simultaneously engaging and disengaging the resistor taps. The brushes may be arranged to pass from one contact to another one at a time as shown, or two at a time while the other brushes maintain their existing connections, to provide a number of steps greater than the number of steps defined by the contacts. Star wheel 63 may or may not be provided with a sufficient number of teeth to permit leaving brushes 30 to 33 in the intermediate positions defined by their staggering.

Fig. 2 diagrammatically illustrates the windings of receiver 36, which comprise a pair of stator windings 68, 69. Winding 68 is connected between brushes 30 and 32 and winding 69 is connected between brushes 31 and 33 whereby variable currents are supplied from battery 27 to the windings through resistor 29. Windings 68, 69 are distributed over the bore of the stator 70 of receiver 36 diagrammatically illustrated in Figs. 3 and 4 and are overlapping to insure the continuity of motion of the associated rotor 71. The rotor may consist essentially of a block of paramagnetic material or a permanent magnet, but is preferably provided with a magnetizing winding 72 connected with battery 27. It will be understood that a receiver of any type other than the rotary type may also be obtained by suitably modifying stator 70 and by replacing rotor 71 by a member otherwise movable with respect to the stator.

Means are provided for causing the displacements of the rotor or other movable member to tend to be proportional to all the displacements of lever 34 within a predetermined range, such means comprising the distribution of windings 68, 69 on stator 70 relative to the variation of the current therethrough between selected positions of lever 34 as determined by the distribution of resistor 29 between the selected positions of brushes 30 to 33. Such means also cause the action of windings 68, 69 on rotor 71 to be uniform for all positions of brushes 30 to 33 within a predetermined range.

More specifically, the active conductors of windings 68, 69 are distributed on the bore of stator 70 according to a sinusoidal law. This means that the number of conductors of each winding occupying a unit length of the periphery of the stator bore is proportional to the sine of the angle defined by radii passing through the unit length considered and through a reference point of the bore. Although the conductors may be strung within the bore of the stator it is generally preferred to insert all the conductors occupying a unit length in a separate slot, the unit length then being the slot pitch of the stator. To render the action of windings 68, 69 on rotor 71 uniform for all positions of rotor 71 within a predetermined range, the slots and the rotor are skewed relatively to one another. For example, the slots may be made parallel to the rotor axis and the polar projections of the rotor may be skewed with respect to this axis as shown in Fig. 5.

The arrangement of winding 68 in the stator slots is indicated in Fig. 3, which shows the end connections of winding 68 only. There are no conductors in the top and bottom slots and the number of conductors per slot increases from slot to slot to reach a maximum in the slots at the level of the rotor axis. The end connections are between conductors at the same level to form a winding having a vertical magnetic axis. Winding 69 has the same number of turns and the same resistance as winding 68 and may be disposed in the same slots. If rotor 71 is of the two pole type, winding 69 is arranged at 90 degrees with respect to winding 68 as appears from a comparison of the end connections of the two windings illustrated in Figs. 3 and 4. In receivers having $n$ pairs of poles, windings 68, 69 each comprise $n$ sinusoidally arranged portions and are relatively displaced by $90/n$ mechanical degrees or 90 electrical degrees. Stator 70 may also be provided with more than two windings, transmitter 28 then being supplied with a corresponding number of brushes.

To obtain proportionality between the angular displacements of lever 34 and of rotor 71 within a predetermined range, resistor 29 is so distributed between taps as to cause the currents through windings 69 and 68, respectively, to be in a ratio equal to the tangent of an angle proportional to the angular displacement of lever 34 from position zero. If the taps of resistor 29 are arranged in a circle and are equidistant, the above angle is the angular displacement from the position shown of a fictitious brush 73 effecting the same connections as brush 30 and assumed to follow brush 30 step by step. Resistor 29 being provided with 12 taps, each step of brush 73 encompasses an angle of 30°, while each step of lever 34 may be given any desired value by suitably arranging contacts 67. To obtain in addition a uniform action of windings 68, 69 on rotor 71 within a predetermined range, resistor 29 is so distributed between taps that the currents through windings 69 and 68, respectively, vary as the sine and cosine of the angular displacements of fictitious contact arm 73 from position zero at tap 29a. Resistor 29 comprises four identical portions comprised between taps 29a and 29d, 29d and 29g, 29g and 29j, 29j and 29a. Designating by R the resistance of each resistor portion and by $2mR$ the resistance of winding 68, the resistance $kR$ included between any tap of section 29a, 29d and tap 29a, for example, may be found from the relation:

$$k^2 \cos x - k(m + \cos x) + m(1 - \cos x) = 0$$

wherein $x$ is the angle described by fictitious brush 73 to reach the tap considered. If, however, the resistance of windings 68, 69 can be chosen very large relative to resistance R, the above relation may be reduced to the approximate simplified form $k = 1 - \cos x$.

The extent of rotation of rotor 71 is limited at two predetermined positions at 360° from each other corresponding to position 6 and 6' of transmitter 28 by means of stops 74, 75 cooperating with an element such as arm 77 mounted on shaft 37. Resistor 29 and windings 68, 69 may be jointly disconnected from battery 27 by opening a switch 78 in the connections therebetween. Rotor 71 is then locked in its position by means of a brake 79 interlocked with switch 78 and acting on a brake drum 80. Brake 79, however, permits manual operation of rotor 71 by means of a hand wheel 81. Rotor 71 actuates the shaft 37 of rheostat 38. The rheostat comprises a pair of brushes 82 mounted on shaft 37 and cooperating with a commutator 83 of which the segments are connected with the taps of a resistor 84. Rheostat 38 is connected as a voltage divider for impressing on winding 13 a reversible voltage of variable value ranging from zero to the full voltage of battery 27.

The preferred embodiment of transmitter 41 is illustrated in Fig. 6. In this embodiment resistor 42 is provided with taps 42a to 42h connected with a plurality of contacts 86 and is distributed between taps similarly to resistor 29. Resistor 42, however, is provided with only 8 taps which are shown as being disposed in a circle at 45° from one another. Contacts 86 are selectively engaged by brushes 43 to 46 in response to rotation of shaft 40 by means of rotor 71. Receiver 48 is similar to receiver 36 and comprises two overlapping stator windings 87, 88 connected with brushes 43 to 46 and a rotor 89 provided with a winding 90 energized from battery 27. Receiver 49 likewise comprises overlapping stator windings 91, 92 and a rotor 93 provided with a winding 94. Since windings 87, 91 are connected in parallel and windings 88, 92 are also connected in parallel, the distribution of resistor 42 between taps must be computed on the basis of a receiver resistance equal to the equivalent resistance of the two receivers connected in parallel. When engine 11 is to be operated alone, receiver 49 may be disconnected from transmitter 41 and two resistors 96 having the same resistance as windings 91 and 92 are then preferably substituted for these windings in the circuits of transmitter 41. A switch 97 serves for selectively connecting resistors 96 and windings 91, 92 with brushes 43 to 46.

The invention has been more specifically illustrated and described in connection with embodiments wherein a variable resistance is utilized for varying in the desired manner the supply of direct current energy to the windings of the stator of the receiver to thus vary the energizing effect of such windings in the desired manner. However, reference herein to a variable resistor is contemplated to be in its broad sense, such as includes known equivalent devices of an ohmic resistance for varying in the desired manner the electrical energy supplied to the energizing windings of the receiver, to produce the desired energizing effects of such windings.

Means are provided for causing rotors 89 and 93 to be maintained in the positions shown during displacement of brushes 43 to 46 from the position shown within a predetermined range and for causing the rotors to be variably displaced upon movement of the brushes within another predetermined range. Such means comprise the distribution of resistor 42 between positions of shaft 40 and the arrangement of contacts 86. In particular, contacts 86 comprise contacts 86a to 86d maintaining the connections shown during movement of shaft 40 through several steps to thereby maintain rotors 89, 93 in the positions shown. Other contacts 86 are symmetrically arranged with respect to contacts 86a to 86d and are connected in pairs to the taps of resistor 42 to cause movement of rotors 89, 93 in the clockwise direction upon movement of shaft 40 in either direction away from the range of engagement of brushes 43 to 46 with contacts 86a to 86d. As a result of this arrangement, rotation of lever 34 in either direction away from the range of positions 3 to 3', which causes rotation of rotor 71 in a corresponding direction, causes rotation of rotors 89, 93 only in the clockwise direction.

The extent of rotation of rotor 89 in the counterclockwise direction is normally limited to the position shown by means comprising a resilient stop 98 and an arm 99 mounted on the rotor shaft. When brushes 43 to 46 engage contacts 86a to 86d, arm 99 is applied against stop 98 as a result of the arrangement of windings 87, 88 and of resistor 42. A push button switch 100 may be provided for short circuiting portions of resistor 42 while brushes 43 to 46 engage contacts 86a to 86d to cause rotor 89 to rotate counterclockwise past the position shown against the action of stop 98. The movement of rotor 89 in the clockwise direction may be limited by a second stop 101. The shaft of rotor 89 is provided with a pinion 102 engaging a rack cut into a bushing 103 of governor 18. The bushing provides a variable abutment for the spring 104 restraining the action of the flyballs 106 of the governor. The flyballs control the position of a valve 107 controlling the flow of oil under pressure between a pump 108 and a servomotor 109 acting on shaft 19. Valve 107 may also be actuated independently of the flyballs by causing abutment of bushing 103 against a nut 110 screwed on the valve spindle.

Brush 50, which is actuated by shaft 19, preferably engages selected points of resistor 54 through a plurality of contacts 111, of which contact 111a provides for invariable connection of resistor 54 with stator windings 112, 113 of receiver 57 during movement of brush 50 through a predetermined range. Because transmitter 52 is provided with only one brush, the extent of rotation of rotor 114 of receiver 57 cannot exceed the angle between windings 112 and 113, which angle in turn cannot exceed 180 degrees. The windings are therefore relatively displaced by an angle larger than 90 degrees, such as 120 degrees, for example. To obtain displacements of rotor 114 proportional to the displacements of brush 50 from its last position engaging contact 111a, resistor 54 is so distributed between steps that the currents $I_1$ and $I_2$ through windings 112 and 113 for different positions of brush 50 satisfy the relation:

$$I_1 = I_2 (\sin a \cot x - \cos a)$$

wherein $a$ is the angle between the magnetic axes of windings 112 and 113 and $x$ is the angle of rotation of brush 50 from its last position in engagement with contact 111a. To prevent overtravel of brush 116 of rheostat 59 in response to sudden actuation of shaft 19, rotor 114 is preferably provided with a damping device 61. Device 61 is generally similar to the above described receivers but is provided with only one distributed stator winding 117 energized from battery 27. The rotor 118 of device 61 is provided with a winding 119 in closed circuit with an adjustable resistor 120. The shafts of rotors 114, 118 are connected together by suitable resilient means such as a spiral spring 121.

The elements of the system are illustrated in Figs. 1, 2 and 6, assuming the ship to be at standstill while engines 11 and 20 are running idle. As the two engines are jointly controlled in identical manners, only the control of engine 11 will be considered hereinafter. Winding 68 is energized at the full voltage of battery 27 through contact 67a, brush 30, switch 78, winding 68, switch 78, brush 32 and contact 67b back to the battery while winding 69 is short circuited through switch 78, brush 31, contact 67c, tap 29d, the diametrical connection to tap 29j, contact 67d, brush 33 and switch 78. Rotor 71 is accordingly maintained in the vertical position shown by the magnetic attraction of winding 68. Brushes 82 are in a position short circuiting winding 13 so that generator 12 does not supply current to motor 14 and the motor remains at standstill. Winding 87 of receiver 48 is energized at the full voltage of battery 27 through contact 86a, brushes 43 and 45 and contact 86c, while winding 88 is connected between equipotential taps 42c and 42g through contacts 86b, 86d and brushes 44, 46 and is therefore without current. Winding 87 attracts rotor 89 towards the vertical position to apply arm 99 against stop 98 without, however, causing the stop to yield. Bushing 103 is thus maintained forcibly in a well defined position for causing governor 18 to regulate the speed of engine 11 at normal idling speed.

To cause the ship to travel ahead lever 34 is first moved by one step into position 1. Brush 30 then engages contact 67e with the same results as if fictitious brush 73 were displaced by 30 degrees to tap 29b. The other brushes are likewise moved by one step. Current then flows from battery 27 to winding 68 through tap 29a, resistor 29, tap 29b, contact 67e, brush 30, switch 78, winding 68, switch 78, brush 32, contact 67f, tap 29h, resistor 29 and tap 29g back to the battery. Winding 69 likewise receives current from battery 27 through tap 29a, resistor 29, tap 29k, contact 67h, brush 33, switch 78, winding 69, switch 78, brush 31, contact 67g, tap 29e, resistor 29 and tap 29g back to the battery. The current through winding 68 is thus reduced from its initial value I to a value I cos 30° while winding 69 receives a current equal to I sin 30°. Because of the sinusoidal arrangement of the conductors of windings 68, 69, the joint magnetic effect of the windings is then the same as would be obtained by means of winding 68 alone assumed to carry current I and to have been shifted around stator 70 by 30°. Rotor 71 therefore tends to be rotated by 30° but actually rotates by a slightly smaller angle depending on the torque required for overcoming the friction of brushes 82 and 43 to 46 and of their mechanical linkages. Movement of rotor 71 causes brushes 82 to rotate by one step of commutator 83 to impress a relatively low voltage from resistor 84 of the winding 13. Generator 12 is thereby excited and supplies current to motor 14 which drives propeller 16 at low speed.

Further movement of lever 34 into position 2 moves brushes 30 to 33 by another step to change the currents through windings 68 and 69 to I cos 60° and I sin 60°, respectively, in a manner similar to that above described. The windings then exert the same efforts on rotor 71 as would be obtained by means of winding 68 alone carrying current I and shifted by 60°. Rotor 71 therefore tends to rotate to a position at 60° from the vertical. Brushes 82 are also rotated by another step to impress an increased voltage from resistor 84 on field 13 and thereby increase the speed of propeller 16.

Further movement of lever 34 into position 3 causes rotor 71 to rotate to a position at 90° from the vertical. Brushes 82 then connect field winding 13 directly with the terminals of battery 27 and the field winding receives its maximum excitation current. Brushes 43 to 46 are then disengaged from contacts 86a to 86d and engage the adjacent contacts 86e to 86h. Winding 87 then receives current from battery 27 through tap 42a, resistor 42, tap 42b, contact 86e, brush 43, winding 87, brush 45, contact 86f, tap 42f, resistor 42 and tap 42e back to the battery. Winding 88 receives current from battery 27 through tap 42a, resistor 42, tap 42h, contact 86g, brush 46, winding 88, brush 44, contact 86h, tap 42d, resistor 42 and tap 42e back to the battery. Windings 87, 88 receive currents I cos 45° and I sin 45° to maintain rotor 89 in the position shown at 45° with the vertical. Arm 99, however, is then no longer applied against stop 98 by rotor 89.

Further movement of lever 34 into position 4 causes a further 30° movement of rotor 71. Brushes 82 are rotated another step without, however, having any further effect on the flow of current through field winding 13. Shaft 40 is also rotated another step to cause winding 88 to be impressed with the full voltage of battery 27 while winding 87 is maintained without current through connections similar to those above described. Rotor 89 accordingly tends to assume a horizontal position, thereby depressing bushing 103 of governor 18 against the action of spring 104. The bushing depresses valve 107 through spring 104 and the valve admits oil under pressure to servomotor 109. The servomotor rotates shaft 19 which causes fuel pump 17 to supply an increased amount of fuel to engine 11. The engine accordingly speeds up and the output voltage of generator 12 is increased with the result that the speed of propeller 16 is again increased. The speed of engine 11, however, increases only to such extent as to cause flyballs 106 to return valve 107 to the neutral position shown.

Movement of lever 34 into position 5 causes further rotation of rotors 71, 89 in the manner above described, to thereby further increase the speed of engine 11 and of propeller 16. During the above described movement of lever 34 from position zero to position 5 in equal steps, rotor 71 likewise rotates in equal angular steps to corresponding positions. During this movement, the action of windings 68, 69 on rotor 71 is uniform, i. e., the same torque would be required to displace rotor 71 from its position regardless of which position the windings cause the rotor to assume. This torque varies according to a sinusoidal function of the angle by which the rotor is displaced from its position and is therefore maximum when the rotor is moved by 90°.

When lever 34 is moved another step from position 5 to position 6, however, brushes 30, 32 disconnect winding 68 from taps 29f, 29m and reconnect it instead with taps 29h, 29b. Brushes 31 and 33 likewise remove the connections of winding 69 with resistor 29 by two taps, and the windings receive currents tending to rotate rotor 71 by two 30° steps. Stop 74, however, only permits one further 30° rotation of rotor 71. Arm 77 is therefore forcibly applied against stop 74 and rotor 71 is positively maintained in its final position corresponding to the maximum speed of propeller 16 and of the ship. Brushes 82 are also moved by another step without influencing the flow of current through winding 13. Shaft 40 is rotated by a final step to move brushes 43 to 46 into engagement with contacts such as contact 86k, which are preferably of arcuate form to insure certain engagement of the brushes therewith even if stop 74 becomes worn or misalined. The latter movement of shaft 40 causes the connections of windings 87, 88 with resistor 42 to be moved by two taps so as to tend to cause rotor 89 to rotate by two 45° steps in the manner above explained with respect to rotor 71. Arm 99 is thereby forcibly applied against stop 101 and bushing 103 is depressed to its maximum extent to cause the governor to regulate the speed of engine 11 at its maximum normal value. Propeller 16 is then driven at maximum speed.

The speed of the ship may be decreased to any desired extent and the ship may be brought to standstill by means of lever 34 by a sequence of operations converse of that above described. The ship may also be caused to travel astern at variable speed by moving lever 34 into any one of positions 1' to 6'. Such movement causes brushes 30 to 33 to supply to windings 68, 69 current causing rotation of rotor 71 in the counterclockwise direction. Rotation of rotor 71 to positions correspond to positions 1' to 3' causes rheostat 38 to impress increasing voltages on field winding 13 but such voltages are of polarity opposite to that obtained by movement of lever 34 into positions 1 to 3. The output voltage of generator 12 is accordingly reversed and the direction of rotation of motor 14 is also reversed. Shaft 40 is moved like shaft 62 in the counterclockwise direction. When lever 34 reaches positions 4' to 6' rotor 89 is caused to rotate in the clockwise direction exactly in the manner above described to gradually increase the speed of engine all because of the symmetrical arrangement of contacts 86.

Regardless of the direction of travel of the ship, the action of governor 18 on shaft 19 is normally such as to maintain brush 50 in engagement with contact 111a. Winding 112 therefore normally remains energized at the full voltage of battery 27 and winding 113 is short circuited and without current. Rotor 114 is then maintained in the position shown. If, however, the resistance to the motion of the ship becomes excessive, engine 11 tends to slow down and governor 18 causes servomotor 109 to rotate shaft 19 to increase the supply of fuel to the engine beyond the normal maximum rate. Brush 50 is thereby moved away from contact 111a into engagement with another contact 111. Windings 112, 113 then receive currents causing rotor 114 to rotate in the clockwise direction in the manner above described with respect to rotor 71.

Brush 116 is actuated by rotor 114 to insert a variable portion of resistor 59 in series with resistor 84 and field winding 13. The excitation of generator 112 is thereby decreased and the overload on the engine is reduced to a value within the permissible range of overloads. When overloads are suddenly applied, as in a tug berthing a ship or in a railway vehicle at starting, the action of governor 18 tends to become excessive because the changes in the flow of current through the highly inductive field winding 13 lag behind the changes in the field circuit resistance produced by movement of brush 116. The correcting action of rheostat 59 is then also excessive, causing the governor and the rheostat to hunt. When rotor 114 rotates, however, it is gradually retarded by spring 121 and thereafter slowly permitted to assume a position of equilibrium while rotor 114 drives rotor 118. Rotor 118 does not immediately follow rotor 114 because device 61 acts as a generator supplying current to resistor 120. By proper adjustment of resistor 120 the movement of rotor 114 may be rendered dead beat.

When shaft 60 is in the position shown, or at least whenever brushes 43 to 46 engage contacts 86a to 86d, the engines may be shut down by pressing push button switch 100. Winding 87 is then already energized at the full voltage of battery 27 and the push button short circuits part of resistor 42 to impress the full voltage of the battery on winding 86. Under the combined action of the two windings rotor 89 develops a counterclockwise torque equal to normal torque multiplied by $\sqrt{2}$ tending to bring the rotor to a position at 90° to the position shown. This torque is sufficient to cause stop 98 to yield while bushing 103 is raised in abutting engagement with nut 110 to raise valve 107. The valve releases the oil pressure in servomotor 109 and shaft 19 is thereby caused to rotate clockwise to stop the supply of fuel to engine 11.

In the embodiment illustrated in Fig. 7 brushes 30 to 33 are assumed to be associated with a single row of contacts connected with the taps of resistor 29. The brushes then may no longer be mounted on substantially parallel radii on shaft 62 but must be mounted at substantially 90° from each other. The different contacts are angularly spaced by the same angle as the resistor taps and brush 30 travels step by step through the same angles as fictitious brush 73 of Fig. 2. With this arrangement the currents flowing through windings 69 and 68 are in a ratio equal to the tangent of the angle of displacement of the brushes from position zero and are further respectively proportional to the sine and cosine of the same angle. If rotor 71 is of the two pole type, the rotor is given angular displacements equal to the displacements of brushes 30 to 33 between positions 5 and 5'. To apply arm 77 against stop 74 or 75, however, the brushes must be rotated to such extent as to move brush 30 through one step past tap 29g. If neither the transmitter nor the receiver is provided with a stop, rotor 71 may be rotated continuously in one direction by continuously turning lever 34 in the same direction. The receiver may also be caused to function as a direct current motor by coupling shaft 62 with the shaft of rotor 71.

In the embodiment illustrated in Fig. 8 resistor 29 is assumed to be supplied with current from a source having a midtap. As it is not generally desirable to tap a battery supplying auxiliary power, current is preferably obtained from an alternating current generator 122 through a transformer 123 having a tapped secondary winding and through a full wave rectifier 124. The transformer secondary midtap is connected with taps 29d and 29j of resistor 29. Windings 68, 69 are connected between brushes 30, 31 and taps 29d, 29j, and the distribution of resistor 29 between taps must be computed on the basis of windings 68, 69 having a resistance $mR$ instead of $2mR$. The operation of the present embodiment is identical to that of the embodiment illustrated in Fig. 7.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a control system, a source of electric current, a signal transmitter comprising a resistor and contact means actuable in variable engagement with said resistor at selected positions, and a signal receiver comprising a rotor member and a stator member, one of said members being provided with two windings connected with said source through said resistor and said contact means and relatively displaced by ninety electrical degrees, each of said windings having its active conductors distributed on said one of said members according to a sinusoidal law, and said resistor being so distributed between selected positions of said contact means as to cause the currents through said windings to be in a ratio equal to the tangent of an angle proportional to the displacement of said contact means from a predetermined position, to cause the angular displacements of said rotor to tend to be proportional to all the displacements of said contact means within a predetermined range.

2. In a control system, a source of electric current, a signal transmitter comprising a resistor and contact means actuable in variable engagement with said resistor at selected positions, a signal receiver comprising a rotor member and a stator member, one of said members being provided with two windings connected with said source through said resistor and said contact means and relatively displaced by ninety electrical degrees, each of said windings having its active conductors distributed on said one of said members according to a sinusoidal law, and said resistor being so distributed between selected positions of said contact means as to cause the currents through said windings to vary respectively as the sine and the cosine of an angle proportional to the displacement of said contact means from a predetermined position, whereby the action of said windings on the other one of said members is rendered uniform for all positions of said contact means within a predetermined range.

3. In a control system, a source of electric current, a signal transmitter comprising a tapped resistor and contact means actuable in two directions to variably engage said resistor at selected positions, and a signal receiver comprising a fixed member and a movable member, one of said members being provided with a plurality of relatively displaced windings connected with said source through said resistor and said contact means, the other one of said members being arranged in inductive relation to said windings said contact means being provided with two sets of contacts severally connected with the same set of taps of said resistor to cause movement of said movable member in a single predetermined direction upon movement of said contact means in either direction in engagement with one of said sets of contacts away from a predetermined range intermediate said sets of contacts.

4. In a control system, a source of electric current, a signal transmitter comprising a resistor and contact means actuable to variably engage said resistor at selected positions, a signal receiver comprising a pair of relatively movable members, one of said members being provided with a plurality of windings connected with said source through said resistor and said contact means, a second signal receiver comprising a second pair of relatively movable members, one of the members of said second pair being provided with a second plurality of windings, resistor means having substantially the same resistance as the second said windings, and a switch for selectively connecting said resistor means and the second said windings in parallel with the first said windings.

5. In a control system, a source of electric current, a signal transmitter comprising a resistor provided with taps and a plurality of contact members jointly actuable in selective engagement with said taps, and a signal receiver comprising a pair of relatively movable members, one of said members being provided with a plurality of windings severally connected with said source through said resistor and said contact members, the different said contact members being staggered with respect to said taps to prevent said contact members from all simultaneously engaging and disengaging said taps.

6. In a control system, a source of electric current, a signal transmitter comprising a resistor connected across said source and a single contact actuable in variable engagement with said resistor at selected positions, and a signal receiver comprising a pair of relatively rotatable members, one of said members being provided with a pair of relatively angularly displaced windings serially connected across said source and the other one of said members being arranged in inductive relation to said windings, the point of juncture of said windings being connected with said contact to cause said members to assume a relative angular position corresponding to the position of said contact at every instant.

7. In a control system, a source of electric current, a signal transmitter comprising a resistor connected across said source and a single contact actuable in variable engagement with said resistor at selected positions, and a signal receiver comprising a rotor member and a stator member, one of said members being provided with two windings serially connected across said source and relatively displaced by a predetermined electrical angle, each of said windings having its active conductors distributed on said one of said members according to a sinusoidal law and the point of juncture of said windings being connected with said contact, said resistor being so distributed between selected positions of said contact as to cause the currents through said windings to be in a ratio equal to the sine of said electrical angle times the cotangent of a second angle proportional to the displacement of said contact from a predetermined position less the cosine of said electrical angle.

8. In a control system, a source of electric current, a signal transmitter comprising a resistor and contact means actuable in variable engagement with said resistor at selected positions, and a signal receiver comprising a rotor member and a stator member, one of said members being provided with two windings connected with said source through said resistor and said contact means and relatively displaced by a predetermined electrical angle, each of said windings having its active conductors distributed on said one of said members according to a sinusoidal law, and said resistor being so distributed between selected positions of said contact means as to cause the currents through said windings to be in a ratio equal to the sine of said electrical angle times the cotangent of a second angle proportional to the displacement of said contact means from a predetermined position, less the cosine of said electrical angle.

9. In a control system, a source of electric current, a signal transmitter comprising a resistor and contact means actuable in variable engagement with said resistor at selected positions, and a signal receiver comprising a rotor member and a stator member, one of said members being provided with a plurality of windings connected with said source through said resistor and said contact means, each of said windings having its active conductors distributed on said one of said members according to a sinusoidal law and said resistor being so distributed between selected positions of said contact means as to cause the currents through said windings to vary according to harmonic functions of an angle proportional to the displacement of said contact means from a predetermined position.

10. In combination, a dynamo-electric device comprising a rotor member and a stator member, one of said members being provided with a plurality of windings each having its active conductors distributed on said one of said members according to a sinusoidal law, and rotary means connected with said windings for supplying to said windings electric currents varying according to harmonic functions of the angular displacements of said rotary means.

11. In a control system, a source of electric current, a signal transmitter comprising a resistor and contact means actuable in variable engagement with said resistor at selected positions, a signal receiver comprising a rotor member and a stator member, one of said members being provided with a plurality of relatively angularly displaced windings connected with said source through said resistor and said contact means and the other one of said members being arranged in inductive relation to said windings to cause said rotor to receive variable angular displacements through a predetermined range in response to displacements of said contact means from one extreme position to another extreme position, and means for limiting the extent of angular displacement of said rotor comprising a stop and an element of said rotor, said element engaging said stop upon rotation of said rotor into a predetermined intermediate position of said range to cause said rotor to urge said element against said stop upon movement of said contact means into one of said extreme positions.

12. In a control system, a source of electric current, a signal transmitter comprising a resistor and contact means actuable in variable engagement with said resistor at selected positions, a signal receiver comprising a rotor member and a stator member, one of said members being provided with a plurality of relatively angularly displaced windings connected with said source through said resistor and said contact means and the other one of said members being arranged in inductive relation to said windings to cause said rotor to receive variable angular displacements through a predetermined range in response to displacements of said contact means from one extreme position to another extreme position, means for limiting the extent of angular displacement of said rotor comprising a resilient stop and an element of said rotor, said element engaging said stop upon rotation of said rotor into a predetermined intermediate position of said range to cause said rotor to urge said element against said stop upon movement of said contact means into one of said extreme positions, and means for shunting a portion of said resistor while said contact means is in said one of said extreme positions to cause said rotor to rotate past said intermediate position against the action of said stop.

EDWARD H. STIVENDER.